R. G. DOWINS.
CLUTCH DEVICE.
APPLICATION FILED JUNE 3, 1915.
1,184,232. Patented May 23, 1916.
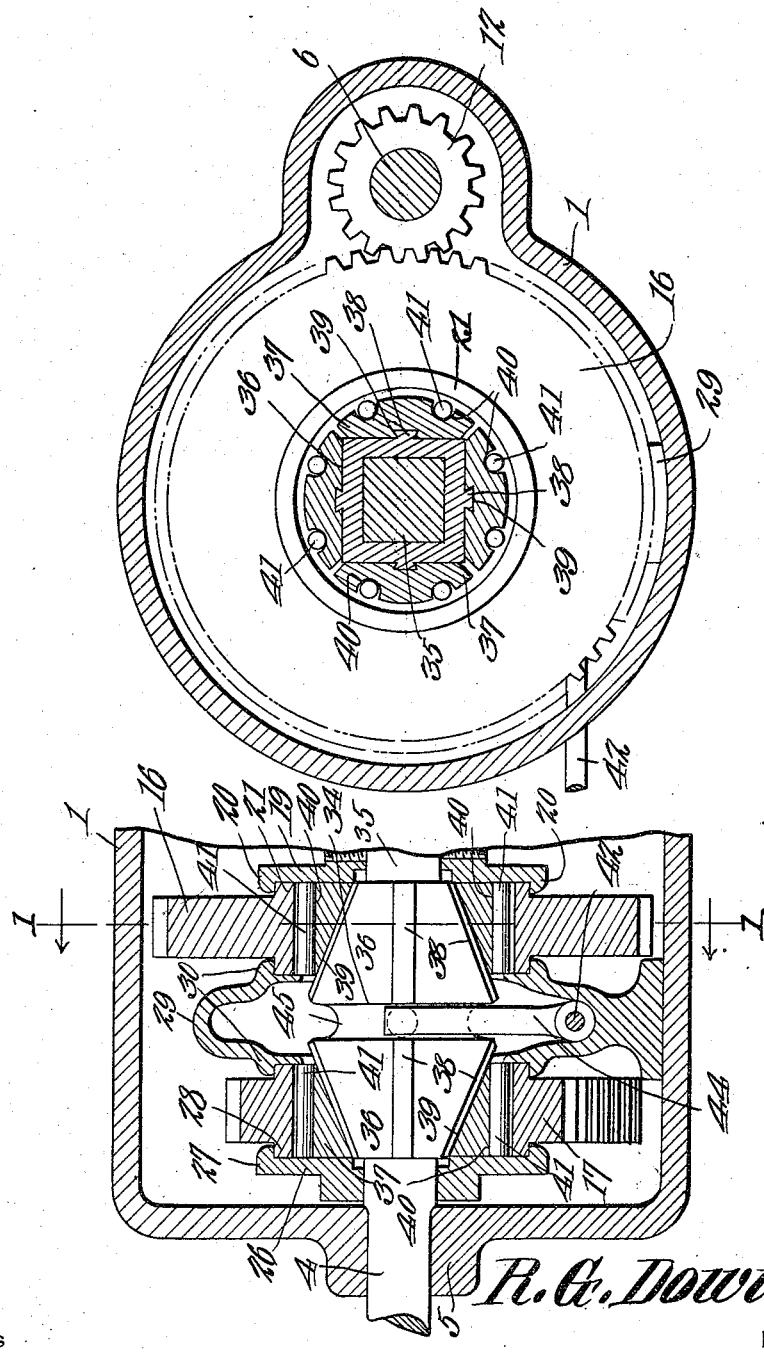

UNITED STATES PATENT OFFICE.

RICHARD G. DOWINS, OF TURTLE CREEK, PENNSYLVANIA, ASSIGNOR OF ONE-THIRD TO FRANK S. MADDOCK, OF TURTLE CREEK, PENNSYLVANIA, AND ONE-THIRD TO ANTON J. PFISTERER, OF EAST PITTSBURGH, PENNSYLVANIA.

CLUTCH DEVICE.

1,184,232.

Specification of Letters Patent. Patented May 23, 1916.

Application filed June 3, 1915. Serial No. 31,926.

*To all whom it may concern:*

Be it known that I, RICHARD G. DOWINS, a citizen of the United States, residing at Turtle Creek, in the county of Allegheny and State of Pennsylvania, have invented a new and useful Clutch Device, of which the following is a specification.

The present invention appertains to clutches, and aims to provide a novel and improved clutch device adapted particularly for use in variable speed transmissions, although the device may be employed in divers capacities.

It is the object of the invention to provide a clutch device of unique construction and operation for effectively making and breaking the connection between the driving and driven elements, the present clutch device having improved features and details of construction to enhance the utility and efficiency thereof.

The present mechanism is also comparatively simple and inexpensive in construction, is compact and nonencumbering, and is also thoroughly practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a cross section of the mechanism taken on the line 1—1 of Fig. 2. Fig. 2 is a fragmental longitudinal section of the mechanism illustrating the clutch device.

Although a portion of a variable speed transmission is illustrated and described, it is to be understood that the clutch device may be employed in various capacities, the transmission being shown chiefly for the purpose of disclosing the utility of the clutch device.

The transmission is confined within a suitable casing 1, and the driven shaft or element 4 is journaled through a bearing 5 carried by one end of the casing 1. A counter shaft 6 forming the driving element is mounted within the casing. A gear 12 is keyed upon the shaft 6 and coöperates with gear carried by the driven shaft 4. The gear 12 intermeshes with a spur gear 16 carried by the driven shaft. The shaft 6 is also connected to a gear 17 carried by the shaft 4.

Instead of the shaft 6 being the driving element, and the shaft 4 being the driven element, the order may be reversed so that the shaft 6 is driven from the shaft 4. The gist of the invention resides in the means employed for making and breaking the connection between the shaft 4 and the gear wheels coöperating therewith.

As a means for mounting the gears 16 and 17 upon the shaft 4, so that the said gears may normally rotate relative to the shaft 4 without rotating the shaft therewith, a bearing 19 is secured upon the shaft 4 within the casing 1 and has an outturned annular flange 20 overlapping the hub 21 of the gear 16. A bearing 26 is secured to the shaft 4 at that side of the gear 17 opposite the gear 16, and has an outstanding annular flange 27 overlapping the hub 28 of the gear 17. A bearing 29 carried by the casing 1 is disposed between the gears 16 and 17, and has outstanding annular flanges 30 overlapping the hubs 21 and 28 of the gear wheels 16 and 17, respectively. The gear wheels 16 and 17 are thus rotatably carried by the respective bearings which are mounted upon the shaft 4 and within the casing, the hubs of the gears being journaled in said bearings. A longitudinally movable clutch member 34 is mounted upon said shaft within the gears 16 and 17. The shaft 4 has a squared or non-circular portion 35 upon which the clutch member 34 is disposed, the clutch member being rotatable with the shaft 4 although it may be shifted longitudinally thereon. The clutch member 34 is employed for connecting either of the gears 16 and 17 to the driven shaft.

The clutch member has the opposite tapered or frusto-pyramidal end portions 36 within the respective gears, and a plurality of wedges 37 bear against the sides of each portion 36 within the respective gear. The sides of the wedges 37 adjacent the portions 36 are flat, while the sides of the wedges adjacent the hubs of the gears are curved to conform to the internal curvature of the hubs. The sides of the portions 36 have longitudinal dove-tailed tongues or ribs 38, and the adjacent sides of the wedges 37 have dove-tailed grooves 39 receiving the tongues 38, whereby the wedges 37 are guided for longitudinal movement relative to the clutch member, and are constrained to rotate more effectively with the clutch member. The wedges 37 are confined between the bearings of the gears, to prevent the wedges from shifting longitudinally, but to enable them to shift laterally or radially into and out of engagement with the hubs of the respective gears. The curved sides of the wedges 37 are provided with longitudinal grooves 40 in which longitudinal rollers 41 are seated, the rollers 41 projecting slightly from the curved sides of the wedges to engage the hubs of the gears when the wedges of one set are expanded.

As a means for operating the clutch member, a rock shaft 42 is journaled through one wall of the casing 1 and within the bearing 29 and a fork 44 is carried by the rock shaft 42. The arms of the fork 44 are received by annular groove 45 with which the clutch member is provided between the portions 36 thereof. The clutch members may rotate with respect to the fork 44, and when the fork 44 is swung about its transverse axis, the clutch member will be shifted longitudinally properly. The shaft 42 may be connected in any suitable manner to an operating lever, whereby the clutch member can be operated properly for connecting the shaft 6 with one of the gears carried by the shaft 4, according to the speed desired.

When the clutch member 34 is at neutral or intermediate positions, the wedges 37 may be spaced from the walls of the hubs of the gears, so that the gears can rotate freely without rotating the shaft 4 therewith. Now, supposing that one speed is desired, the clutch member 34 is moved toward or farther into the gear 16, by properly operating the shaft 42, and this will separate the wedges 37 within the gear 16, so that the rollers 41 are brought with considerable force against the hub 21 of the gear 16. The friction thus created will cause the clutch member 34 to be rotated with the gear 16, for rotating the shaft 4. The gear 16 being of considerably larger diameter than the gear 12, will cause the shaft 4 to be rotated at less velocity than the shaft 6. When the respective rollers 41 are being brought into engagement with the hub 21 of the gear 16, the rollers gradually grip the hub 21 and rotate the clutch member 34 with the gear 16, so as to avoid a jerking strain, as will be evident. When a different speed is desired, the rock shaft 42 is swung in the opposite direction whereby the fork 44 thereof will move the clutch member 34 longitudinally to retract the respective wedges 37 out of engagement with the hub 21 of the gear 16, while the other wedges 37 operated by the clutch member 34 will be expanded into engagement with the hub 28 of the gear 17. The gear 17 is thus connected with the shaft 4.

From the foregoing, taken in connection with the drawings the advantages and attributes of the invention are thought to be obvious to those familiar in the art, without further comment being necessary.

Having thus described the invention, what is claimed as new is:

1. In a clutch device, a shaft, a pair of bearings, a rotary member located between said bearings and journaled thereon, a clutch member slidable upon the shaft and having a tapered portion within the rotary member, and wedges between said tapered portion and rotary members and held between said bearings.

2. In a clutch device, a shaft, three bearings, a pair of rotary members disposed between said bearings and journaled thereon, one of said bearings being disposed between the rotary members, a clutch member slidable upon said shaft and having opposite tapered portions within the rotary members, wedges between said tapered portions and rotary members and held between the respective bearings, the clutch member having an annular groove between said portions, and an actuating member carried by said bearing and received by said groove for sliding the clutch member.

In testimony that I claim the foregoing as my own, I have hereto affixed my signature in the presence of two witnesses.

RICHARD G. DOWINS.

Witnesses:
FRANK S. MADDOCK,
ANTON J. PFISTERER.

Copies of this patent may be obtained for five cents each, by addressing the "Commissioner of Patents, Washington, D. C."